United States Patent
Ma et al.

(10) Patent No.: US 6,274,656 B1
(45) Date of Patent: Aug. 14, 2001

(54) PELLETIZING AID FOR POLYMERS

(75) Inventors: Chin-Yuan George Ma, Sugar Land; James Douglas McCullough, Jr., Houston, both of TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 08/273,550

(22) Filed: Jul. 11, 1994

Related U.S. Application Data

(63) Continuation-in-part of application No. 08/091,094, filed on Jul. 13, 1973, now abandoned.

(51) Int. Cl.$^7$ .................................................... C08L 5/20
(52) U.S. Cl. ................................................................ 524/230
(58) Field of Search .............................................. 524/230

(56) References Cited

U.S. PATENT DOCUMENTS

| | | | |
|---|---|---|---|
| 3,733,373 | 5/1973 | McConnell et al. | 260/897 |
| 4,283,502 | 8/1981 | Richardson | 525/66 |
| 4,320,209 | 3/1982 | Chatterjee | 525/6 |
| 4,321,334 | 3/1982 | Chatterjee | 524/579 |
| 4,322,503 | 3/1982 | Chatterjee | 524/224 |
| 4,359,544 | 11/1982 | Hwo et al. | 524/232 |
| 4,467,052 * | 8/1984 | Barnwell et al. | 521/92 |
| 4,554,321 | 11/1985 | Hwo et al. | 525/240 |
| 4,645,792 | 2/1987 | Chatterjee | 524/490 |
| 4,886,849 | 12/1989 | Hwo et al. | 524/263 |
| 4,948,823 | 8/1990 | Wallach | 524/112 |
| 5,030,682 | 7/1991 | Nomura et al. | 524/522 |

FOREIGN PATENT DOCUMENTS 5736140   2/1982   (JP) .

OTHER PUBLICATIONS

Plastics Technology Manufacturing Handbook and Buyers' Guide, 1993–94 Edition.

Shell Chemical Company Brochure on Polypropylene, Jul. 1975.

* cited by examiner

Primary Examiner—Peter D. Mulcahy
(74) Attorney, Agent, or Firm—Y. Grace Tsang

(57) ABSTRACT

This invention relates to the use of a synergistic nucleating package to promote the rapid crystallization of polymers from the melt. This facilitates the ease of fabrication of extruded or molded articles or otherwise shaped objects formed from the melt, including pelleted product from extrusion.

3 Claims, No Drawings

PELLETIZING AID FOR POLYMERS

This is a continuation in part of U.S. Ser. No. 08/091,094 filed Jul. 13, 1993, now abandoned.

BACKGROUND OF THE INVENTION

This invention generally relates to the pelletization of polymers. More particularly, the invention relates to the pelletization of polyolefin copolymers and elastomeric materials. It further relates to the improvement in the ease of fabrication of extruded or molded articles, or otherwise shaped objects, formed from the melt processing of said polymeric materials.

Pelletization of polyolefin copolymer, for example, polybutylene copolymer, especially high melt flow, high ethylene (ethylene content higher than 0.75 wt %), has been very difficult when using either the underwater face cutter or the strand cutting pelletizer. The problem appears to relate to the slow crystallization rate of these polymers which exhibit extreme tackiness in pelletizing. It is known that as the pellets leave the cutting blades, they are very clear and tacky, and collide with other pellets to form agglomerates. With a longer residence time, the pellets change to an opaque color, as they complete their crystallization, become hard and lose their tackiness. These agglomerates frequently plug the pelletizer bowl and the spin dryer. The extrusion line has to be shut down in order to clean the plugged section resulting in undesirable production interruptions. Also, the high number of pellet marriages shown in the final product is not acceptable in the customers' fabrication process.

Using polyethylenes (such as HDPE powder) as an external pelletizing aid to eliminate the surface tackiness is known in the art. The success of this method depends on good dispersion and suspension of HDPE in the slurry water. Therefore, it generally requires the addition of extra portable mixers to the slurry water tank to keep the HDPE from foaming. This method of reducing surface tackiness is very messy and labor intensive. Even under the best of circumstances, a significant fraction (about 20%) of the production has to be discarded due to poor pellet quality and pellet agglomerations. Thus, there continues to exist the need for new and better methods and/or agents for preventing or minimizing stickiness of polymers and copolymers.

The use of a nucleating agent(s) to accelerate crystallization is also known in the art. However, the art clearly teaches that there is no evidence of a universally strong nucleating agent for all polymers, and that an effective nucleating agent for one polymer may be ineffective for even a closely related polymer. The art further teaches that even a compound closely related to an effective nucleating agent for one polymer may be ineffective for that same polymer. Thus, it can be correctly said that no cross-utility exists or is expected for nucleating agent(s), and that the discovery of new and effective nucleants for polymers, especially if such nucleants exhibit synergism continues to be unexpected and desirable.

SUMMARY OF THE INVENTION

It is a general object of the invention to facilitate the pelletization of polymers.

It is a specific object of the invention to provide a nucleating agent package and methods to facilitate the crystallization from the melt of high melt flow polyolefin copolymers.

Accordingly, it is now provided a method for promoting crystallization from the melt of polyolefin copolymers, such as polybutylene copolymers, which comprises adding to a composition comprising the polyolefin copolymer an effective amount of a nucleating package consisting essentially of high melt flow, polypropylene and stearamide.

It is also provided a rapidly melt crystallizable polyolefin copolymer composition comprising an effective amount of a nucleating package consisting essentially of high melt flow polypropylene and stearamide.

DETAILED DESCRIPTION OF THE INVENTION

The following terms when used in this specification including claims shall have the following meaning:

Low Melt Flow Polypropylene means polypropylene having a melt flow of from 0.2 to 2 dg/min.

Medium Melt Flow Polypropylene means polypropylene having from 2 to 8 dg/min.

High Melt Flow Polypropylene means polypropylene having a melt flow of from 8 dg/min. and above.

Broadly speaking all polymers are suitable in the practice of this invention. The term polymers as used herein, unless otherwise specified, includes homopolymers, copolymers, terpolymers and all other known combinations or forms of polymeric materials, including polymers which are elastomeric in nature. The homopolymers generally have less crystalline problems, and are not of the greatest concern.

Polyolefin copolymers typically exhibit slower crystallization rates leading to longer crystallization times. This is usually observed by their low crystallization temperatures which is believed to be caused by the alteration of the crystalline morphology of the primary polymer component. As has been earlier noted, the excessive stickiness resulting from slow crystallization is undesirable. This generally occurs in polyolefin copolymers made up from semi-crystalline polymers such as polyethylene, polypropylene, polybutylene, polyester, polyethylene terephthalate, ethylene vinyl acrylate, and elastomeric polymers such as KRATON® and rubber. Of particular concern are very high melt flow copolymers of butene-1 and ethylene (butene-1-ethylene copolymers).

Butene-1-ethylene copolymers including methods for their preparation are known in the art. Butene-1-ethylene copolymers suitable in the practice of this invention contain from about 0.1 to 8.0 wt % ethylene. Preferably, such butene-1-ethylene copolymers contain from about 0.1 to 7 wt % ethylene, and have melt indices ranging from about 0.2 to 1000 dg/min.

Nucleating agent(s) and/or nucleating packages useful in the practice of this invention generally include an organic fatty amide and a polymeric material with a higher melting point than the base polymer to be pelletized. This class of material hereinafter collectively referred to as nucleants, include stearamide, N,N'-ethylenebis(stearamide), polyethylene wax, and polypropylene. The preferred nucleant is high melt flow polypropylene and stearamide. Generally speaking, an effective amount of nucleants ranges from about 0.1 to 3 wt %, preferably from 0.25 to 2 wt % of the total composition including the base copolymer.

It is noted that the addition of oxidized high density polyethylene powder to the extruder or to the water tank during the process of practicing this invention will result in an improvement in processing conditions. Particularly evident was the resulting increase in the slurry water temperature. Oxidized high density polyethylene powder is commercially available as ACUMIST® and can be obtained from Allied Signal Company. When used, the oxidized high density polyethylene powder is typically present in an amount ranging from 0.1 to 0.5 wt %.

Various other conventional additives can also be listed in the practice of this invention. These additives include corrosion inhibitors, foaming inhibitors, buffers, and neutralizers.

The nucleant can be incorporated into the polyolefin copolymer by using conventional equipment and techniques known in the art. For example, this can be accomplished by blending all of the ingredients in an intensive blender prior to compounding the blend in an extruder. It can also be accomplished by incorporating the nucleant and other additives in a polyolefin copolymer masterbatch.

It is well known in the art that the nucleating ability of a nucleating agent can be assessed from its temperature of crystallization from the melt in a differential scanning calorimeter (DSC). The terms crystallization temperature or recrystallization temperature have been commonly and interchangeably used for this phenomenon. Higher values indicate nucleation improvement.

Subsequent to incorporating the nucleating package into the polyolefin copolymer, the crystallization temperatures of the various samples or runs can be measured in order to determine the efficacy of the nucleant. Alternatively, the pellet quality produced from the polyolefin copolymers comprising the nucleants can be visually inspected. Successful practice of this invention will be specifically evidenced by the relative ease of fabrication of pellets, increase in crystallization temperature, and improved pellet quality including reduced pellet agglomeration. Generally, the successful practice of this invention substantially reduces or eliminates the problems caused by or associated with slow or inadequate polymer crystallization rate.

The following non-limiting examples and tables further illustrate the various aspects of the invention.

EXAMPLES

In the following examples, a Welding Engineers twin screw extruder (20 mm diameter screw) and a Gala underwater pelletizer were used. The slurry water temperature was controlled by the chilled water supply system. The cooling water temperature was about 25° C. Additional cooling can be done either by adding ice cubes to the water bath manually or by installing a chiller.

Example 1

The pellet quality of nucleated butene-1-ethylene copolymers was compared with that of an un-nucleated butene-1-ethylene copolymer. The nucleating package used was 1.0 wt % polypropylene (45 MF) and 0.25 wt % stearamide (Kemamide S). The pelletization conditions are shown in Table 1. It was observed that the nucleated polybutylene was pelletizable when operating the slurry water at 7° C. or lower.

TABLE 1

Processing Condition Using Cold Water Pelletization For Butene-1-Ethylene Copolymers

| GRADE | MANUAL COOLING | | | | | CHILLER* |
|---|---|---|---|---|---|---|
| | DP8310N | DP8510N | DP8910 | DP8910N | DP8910N | DP8910N |
| ZONE 1 | 71 | 60 | 60 | 49 | 52 | 60 |
| ZONE 2 | 135 | 132 | 132 | 127 | 118 | 107 |
| ZONE 3 | 135 | 152 | 135 | 135 | 135 | 118 |
| ZONE 4 | 163 | 154 | 143 | 143 | 127 | 118 |
| ZONE 5 | 138 | 154 | 127 | 132 | 127 | 118 |
| ZONE 6 | 157 | 154 | 138 | 148 | 127 | 132 |
| ZONE 7 | 149 | 149 | 149 | 149 | 149 | 149 |
| MELT ° C. TEMP | 166 | 166 | 145 | 154 | 144 | 146 |
| RPM | 370 | 370 | 250 | 370 | 250 | 200 |
| AMPS | 10.0 | 8.0 | 4.0 | 7.0 | 5.0 | 6.0 |
| MELT** INDEX | 3.2 | 45 | 1000 | 1000 | 1000 | 1000 |
| UNDER WATER PELLETIZATION CONDITIONS | | | | | | |
| WATER TEMP ° C. | 14 | 10–13 | 7 | 7 | 4 | 6 |
| RPM | 1900 | 1900 | 1900 | 1900 | 1900 | 1900 |
| AMPS | 5.0 | 5.0 | 5.0 | 5.0 | 5.0 | 5.0 |

The reported zone temperatures are Extruder Barrel Temperatures in ° C.
*Plus ice cubes
**Measured using the procedure of ASTM D1238 Condition E
DP8310 is a polybutylene-ethylene copolymer (ethylene content is about 5.5 wt %) with a melt index of 3.2 dg/min. and is available from Shell Chemical Company.
DP8510 is a polybutylene-ethylene copolymer (ethylene content of about 5.5 wt %) with a melt index of 45 dg/min and is available from Shell Chemical Company.
DP 8910 is a polybutylene-ethylene copolymer (ethylene content of about 5.5 wt %) with a melt index of approximately 1000 dg/min. and is available from Shell Chemical Company.
Note:
The "N" designation denotes the presence of the nucleating package.

Example 2

Both the nucleated and un-nucleated butene-1-ethylene copolymer samples were evaluated. The nucleated butene- 1-ethylene copolymer contained 1.0 wt % polypropylene (melt flow 45 dg/min) and 0.25 wt % stearamide (Kemamide S). Acumist A-18 (oxidized HDPE) was used as an external pelletizing aid which was mixed in the slurry water tank at 0.2 wt % concentration.

Table 2 lists the process conditions, while Table 3 gives a summary of pellet quality. It shows that good pellet quality was obtained with the nucleated butene-1-ethylene sample by keeping the circulating slurry water temperature at or below 7° C. The processing window of slurry water temperature can be increased to 19° C. by the addition of 0.2 wt % Acumist A-18 to the circulating water.

The results obtained are shown in Tables 4, 5, and 6.

TABLE 4

| Run # | Base Comp. | Additional Modifier Type | Level wt % | DSC Recrystallization Performance Scan Rate °C./min | Recryst. Temp °C. | Exotherm cal/g |
|---|---|---|---|---|---|---|
| 1 | DP8010 | — | — | 10 | 23.3 | 2.3 |
| 2 | DP8010 | PP1 | 1 | | | |
|   |        | NB  | 0.1 | 10 | 27.1 | 2.9 |

TABLE 2

Processing Conditions For Butene-1-Ethylene Copolymers

| RUN NO. | 1 | 2 | 3 | 4 | 5 | 6 | 7 | 8 | 9 | 10 |
|---|---|---|---|---|---|---|---|---|---|---|
| GRADE | DP8910 | DP8910N | DP8910N | DP8910 | DP8910 | DP8910N | DP8910N | DP8910N | DP8910N | DP8910 |
| ZONE 1** | 71 | 60 | 60 | 60 | 49 | 60 | 60 | 49 | 52 | 60 |
| ZONE 2 | 116 | 107 | 107 | 107 | 104 | 116 | 107 | 127 | 118 | 132 |
| ZONE 3 | 116 | 118 | 118 | 118 | 116 | 121 | 118 | 135 | 135 | 135 |
| ZONE 4 | 121 | 118 | 118 | 118 | 118 | 118 | 118 | 143 | 127 | 143 |
| ZONE 5 | 118 | 113 | 113 | 113 | 118 | 118 | 118 | 132 | 127 | 127 |
| ZONE 6 | 121 | 121 | 121 | 121 | 113 | 127 | 132 | 143 | 127 | 138 |
| ZONE 7 | 149 | 149 | 149 | 149 | 149 | 149 | 149 | 149 | 149 | 149 |
| MELT T. °C. | 144 | 144 | 144 | 144 | 144 | 146 | 146 | 154 | 144 | 145 |
| RPM | 240 | 240 | 240 | 240 | 240 | 240 | 240 | 370 | 250 | 250 |
| AMPS | 7.0 | 6.5 | 6.5 | 5.5 | 5.0 | 8.0 | 6.0 | 7.0 | 5.0 | 4.0 |
| UNDER WATER PELLETIZATION CONDITIONS ||||||||||||
| WATER T. °C. | 25 | 25 | 19 | 19 | 9 | 14 | 9 | 7.2 | 4.4 | 7.2 |
| RPM | 1700 | 1700 | 1700 | 1700 | 1700 | 2000 | 1600 | 1900 | 1900 | 1900 |
| AMPS | 4.5 | 4.5 | 4.5 | 4.5 | 4.5 | 5.0 | 5.0 | 5.0 | 5.0 | 5.0 |

*0.2 weight of Acumist A-18 in slurry water
**The reported zone temperatures are Extruder Barrel Temperatures in ° C.
DP8910N is blended with nucleated masterbatch.

TABLE 3

Pellet Quality of Products From Example 2

| PRODUCT | CIRCULATING SLURRY WATER TEMPERATURE (° C.) | PELLET QUALITY |
|---|---|---|
| 8910 Un-nucleated | 25 | Plugged |
|  | 7 | Poor |
| 8910 Un-nucleated with Acumist | 25 | Poor |
|  | 19 | Poor |
|  | 9 | Good |
| 8910 Nucleated | 25 | Plugged |
|  | 7 | Good |
|  | 6 | Good |
| 8910 Nucleated with Acumist | 25 | Fair |
|  | 19 | Good |
|  | 14 | Good |
|  | 9 | Good |

Example 3

In this example the effectiveness of various nucleating agents including the inventive nucleating package were examined. The base copolymer to which the agents were added are DP 8010, DP 8310, and DP 8510.

TABLE 4-continued

| Run # | Base Comp. | Additional Modifier Type | Level wt % | DSC Recrystallization Performance Scan Rate °C./min | Recryst. Temp °C. | Exotherm cal/g |
|---|---|---|---|---|---|---|
| 3 | DP8010 | PP1 | 1 | | | |
|   |        | AC  | 0.25 | 10 | 27.9 | 3.0 |
| 4 | DP8010 | PP1 | 1 | | | |
|   |        | KA  | 0.25 | 10 | 41.0 | 2.2 |
| 5 | DP8010 | PP2 | 1 | | | |
|   |        | AC  | 0.25 | 10 | 28.8 | 2.8 |
| 6 | DP8010 | AC  | 0.25 | 10 | 32.5 | 2.4 |
| 7 | DP8010 | PP1 | 1 | 10 | 29.0 | 3.0 |
|   |        |     |     |    | 28.8 (*) | 2.8 (*) |
| 8 | DP8010 | PP2 | 1 | 10 | 24.5 | 2.6 |

PP1 is polypropylene, 45 dg/min melt flow (ASTM D 1238 L) - DX5088 (Shell)
PP2 is polypropylene, 3 dg/min melt flow (ASTM D 1238 L) - DX5080 (Shell)
NB is sodium benzoate
AC is N,N'-ethylenebis(stearamide) - Acrawax C
KA is stearamide - Kemamide S
DP8010 is a polybutylene-ethylene copolymer with a melt index of 0.2 dg/min and is available from Shell Chemical Company
*Second cooling cycle Table 4 shows the crystallization temperature performance data for the tested nucleating agent(s). The DSC used was a Perkin Elmer DSC-2. The data were collected for one melting-cooling cycle with nominally 5 mg samples. In any cycle, the test sample was held 5 min. at the peak temperature (220° C.) before cooling at the prescribed scanning rate of 10° C.

The results in Table 4 show that the best nucleating (highest crystallization temperature) occurred with the combination of high melt flow polypropylene and stearamide (Run 4.). No other single additive or combination of additives approached its level of performance. High melt flow polypropylene (PP1, Run 7.) showed improvement over low melt flow polypropylene (PP2, Run 8.), but neither approached the performance of the combination of high melt flow polypropylene and stearamide.

TABLE 5

Effectiveness of Nucleating Agents for the Melt Crystallization of Butene-1-Ethylene Copolymer

| Run No. | Formulation | Crystallization Temperature (° C.) | Crystallization Half-Time (min) at 40° C. |
|---|---|---|---|
| 1 | DP8310 | <−5 | |
| 2 | DP8310 + 0.5 wt % Stearamide | 27.6 | |
| 3 | DP8310 + 1.0 wt % HDPE + 0.5 wt % Acrawax C | 25.8 | |
| 4 | DP8310 + 1.0 wt % PE520 | 24.3 | |
| 5 | DP8310 + 1.0 wt % PP230 | <−5 | |
| 6 | DP8310 + 1.0 wt % PP5A09 + 0.25 wt % Kemamide S | 37.4 | 1.6 |

PP 230 is a low molecular weight polypropylene wax of approximately 2000 Mw.
PE 520 is a low molecular weight polyethylene wax of approximately 2000 Mw.
PP 5A09 is polypropylene with a melt flow of 45 dg/min. available from Shell Chemical Company.

TABLE 6

Effectiveness of Nucleating Agents for the Melt Crystallization of Butene-1-Ethylene Copolymers

| Run No. | Formulation | Crystallization Temperature (° C.) | Crystallization Half-Time (min) at 40° C. |
|---|---|---|---|
| 1 | DP8510 | <−5 | |
| 2 | DP8510 + 1.0 wt % PP5A09 + 0.25 wt % Kemamide S | 34.9 | 2.8 |
| 3 | DP8510 + 1.0 wt % PP230 + 0.25 wt % Kemamide S | 7.7 | |
| 4 | DP8510 + 1.0 wt % PE520 | 12.7 | |
| 5 | DP8910 | <−5 | |
| 6 | DP8910 + 1.0 wt % PP5A09 + 0.25 wt % Kemamide S | 33.3 | 2.3 |
| 7 | DP8910 + 1.0 wt % PE520 | 13.5 | |

The results shown in Tables 5 and 6 are consistent with those of Table 4. In Table 5, Run 6 which was conducted utilizing the inventive nucleating package exhibits the best performance. Similarly in Table 6, Runs 2 and 6 which were conducted utilizing the inventive package show the best performance.

It is believed that for stearamide or polypropylene in butylene-ethylene copolymers, the nucleating crystallization temperature is a unique characteristic of the additive species alone, and said temperature is independent of concentration of the nucleant within the given ranges of use. Accordingly, the rules of additivity do not apply, and one would anticipate that compositions containing both nucleating species would have an intermediate crystallization temperature.

It is therefore unexpected to have the high crystallization temperature for combinations of stearamide and high flow polypropylene in butylene-ethylene copolymers. This is indicative of synergism since the two nucleants in some way act together to provide a much higher crystallization temperature than either nucleant alone.

While this invention has been described in detail for the purpose of illustration, it is not to be construed as limited thereby but is intended to cover all changes and modifications within the spirit and scope thereof.

What is claimed is:

1. A method for promoting crystallization from the melt of a semi-crystalline polyolefin copolymer which comprises adding to said copolymer (a) an effective amount of a nucleating package consisting essentially of a high melt flow polypropylene having a melt flow of ≧8 dg/min and stearamide, and (b) an oxidized high density polyethylene powder; wherein said effective amount of nucleating package ranges from about 0.1 to about 3 wt % of the total composition.

2. A method for promoting crystallization from the melt of butene-1-ethylene copolymer which comprises (a) adding to said copolymer from about 0.25 to about 2 wt % of a nucleating package consisting essentially of high melt flow polypropylene having a melt flow of ≧45 dg/min and stearamide, and (b) adding from about 0.1 to 0.5 wt % of oxidized high density polyethylene in a slurry water bath.

3. An improved melt crystallizable composition comprising a semi-crystalline polyolefin copolymer, an oxidized high density polyethylene, and from about 0.1 to about 3 wt % of the total composition a nucleating package consisting essentially of high melt flow polypropylene having a melt flow of ≧8 dg/min and stearamide.

* * * * *